(12) United States Patent
Chien et al.

(10) Patent No.: US 10,895,911 B2
(45) Date of Patent: Jan. 19, 2021

(54) IMAGE OPERATION METHOD AND SYSTEM FOR EYE-TRACKING

(71) Applicant: National Taiwan University, Taipei (TW)

(72) Inventors: Shao-Yi Chien, Taipei (TW); Yu-Sheng Lin, Taipei (TW); Po-Jung Chiu, Taipei (TW)

(73) Assignee: National Taiwan University, Taipei (TW)

( * ) Notice: Subject to any disclaimer, the term of this patent is extended or adjusted under 35 U.S.C. 154(b) by 59 days.

(21) Appl. No.: 16/299,913

(22) Filed: Mar. 12, 2019

(65) Prior Publication Data

US 2020/0166995 A1 May 28, 2020

(30) Foreign Application Priority Data

Nov. 23, 2018 (TW) .............................. 107141770 A

(51) Int. Cl.
*G06K 9/62* (2006.01)
*G06F 3/01* (2006.01)
*G06K 9/46* (2006.01)
*G06K 9/00* (2006.01)

(52) U.S. Cl.
CPC ......... *G06F 3/013* (2013.01); *G06K 9/00604* (2013.01); *G06K 9/4619* (2013.01)

(58) Field of Classification Search
CPC ..... G06F 3/013; G02B 27/0093; A61B 3/113; A61B 5/163; G06K 9/00604; G06K 9/00597–9/00617
See application file for complete search history.

(56) References Cited

U.S. PATENT DOCUMENTS

| | | | |
|---|---|---|---|
| 8,610,768 B2 | 12/2013 | Holmberg | |
| 2015/0241967 A1* | 8/2015 | Saripalle | G06K 9/00597 382/195 |
| 2015/0347814 A1* | 12/2015 | Sheng | G06K 9/00624 382/103 |

OTHER PUBLICATIONS

Cho et al., "Gaze Tracking Based Pointer: Eye-Click", IEEE Publication, 2004, pp. 71-74. (Year: 2004).*
Amir et al., "An embedded system for an eye-detection sensor", Elsevier, Computer Vision and Image Understanding 98 (2005) 104-123. (Year: 2005).*
Office Action dated Jun. 12, 2019 in corresponding Taiwan Patent Application No. 107141770.

* cited by examiner

*Primary Examiner* — Brian Werner
(74) *Attorney, Agent, or Firm* — Donald E. Stout; Stout, Uxa & Buyan, LLP

(57) ABSTRACT

An image operation method and system for obtaining an eye's gazing direction are provided. The method and system employ multiple extraction stages for extracting eye-tracking features. An eye frame is divided into sub-frames, which are then sequentially temporarily stored in a storage unit. Launch features of sub frames are sequentially extracted from the sub frames by a first feature extraction stage, where a data of a former sub-frame is extracted before a data of a latter sub-frame is needed to be stored. Next, the remaining feature extraction stages apply a superposition operation on the launch features to obtain terminal features, which are then computed to obtain an eye's gazing direction.

14 Claims, 2 Drawing Sheets

IMAGE OPERATION METHOD AND SYSTEM FOR EYE-TRACKING

CROSS-REFERENCE TO RELATED APPLICATIONS

The entire contents of Taiwan Patent Application No. 107141770, filed on Nov. 23, 2018, from which this application claims priority, are expressly incorporated herein by reference.

BACKGROUND OF THE INVENTION

1. Field of the Invention

The present invention relates to an operation method and system for eye-tracking or gaze-sensing, and more particularly relates to an image operation method and system for obtaining the point of gaze where one is looking.

2. Description of Related Art

Eye-tracking is a technique for measuring an eye's movements and gazing directions from eye images. Because an eye-tracking module generally includes components placed around the eyes, it is required to have low power consumption, small area, and quick response. However, existing techniques typically computes the eye's gazing direction under the condition that a complete eye frame has been stored. Such a method consumes a lot of power and is prone to delay the image operation and therefore needs to be improved.

SUMMARY OF THE INVENTION

The present invention provides a method and corresponding system hardware design for extracting image features of eye-tracking. The method and system are designed for power saving requirements and adopts multi-stages to reduce the area requirement of hardware and power consumption of memory unit, and decrease the delay during the computation of gaze sensing.

The present invention provides a method and corresponding system hardware design for extracting image features of eye-tracking. The method and system are designed for power saving requirements and extracting necessary information (features) through sub-frames, wherein the first stage features are extracted when obtaining sub-frames, and then the first stage features are computed to obtain the latter (second, third, and so on) stage features so as to compute an eye's gazing direction.

According to an aspect of this invention, an image operation method is provided for obtaining an eye's gazing direction and comprises the steps of: capturing an eye frame and dividing the eye-frame into a plurality of sub-frames; executing a plurality of feature extraction stages to obtain an eye's gazing direction information, wherein the plurality of feature extraction stages comprises at least a launch feature extraction stage and a terminal feature extraction stage, the launch feature extraction stage extracts launch features from the plurality of the sub-frames, and the terminal feature extraction stage extracts terminal features from the launch features; and computing the terminal features to obtain the eye's gazing direction information.

According to an aspect of this invention, an image operation system is provided for obtaining an eye's gazing direction and comprises: a control unit for providing a control command; a processing unit performing a plurality of feature extraction stages on a plurality of sub-frames of an eye frame to obtain an eye's gazing direction information according to the control command, wherein the plurality of feature extraction stages comprises at least a launch feature extraction stage and a terminal feature extraction stage, the launch feature extraction stage extracts launch features from the plurality of the sub-frames, and the terminal feature extraction stage extracts terminal features from the launch features; and a storage unit for storing the launch features and the terminal features.

In one embodiment, the sub-frames comprise at least a first sub-frame and a second sub-frame, and the launch features are extracted by the steps of: (1) storing a data of the first sub-frame in the storage unit; (2) obtaining an former feature from the data of the first sub-frame; (3) deleting the data of the first sub-frame stored in the storage unit; (4) storing a data of the second sub-frame in the storage unit; and (5) obtaining a latter feature from the data of the second sub-frame data; wherein the former feature and the latter feature are two of the launch features.

In some embodiments, two or more of the steps (1)-(5) are performed at the same time. In one embodiment, a parallel processing is adopted with step (1) and step (4) being performed at the same time and step (2) and step (5) being performed at the same time. In one embodiment, a double buffering manner is adopted with step (2), step (3), and step (5) being performed at the same time.

In one embodiment, a matrix multiplication is applied to the launch feature extraction stage to obtain the former feature and the latter feature.

In one embodiment, the terminal feature extraction stage obtains one or the entire terminal features by applying a superposition operation to the former feature and the latter feature.

In one embodiment, any sub-frame has a data amount less than or equal to a data amount of the eye frame.

In one embodiment, the number of the feature extraction stages is at least two.

In one embodiment, the processing unit comprises a single processor.

In one embodiment, the processing unit comprises a plurality of stage processing sub-units.

In one embodiment, the storage unit temporarily stores a data of each of the plurality of sub-frames during the operation of the launch feature extraction stage.

In one embodiment, the image operation system further comprises an image-capturing unit for providing the eye frame.

DETAILED DESCRIPTION OF THE PREFERRED EMBODIMENT

Figure 1:
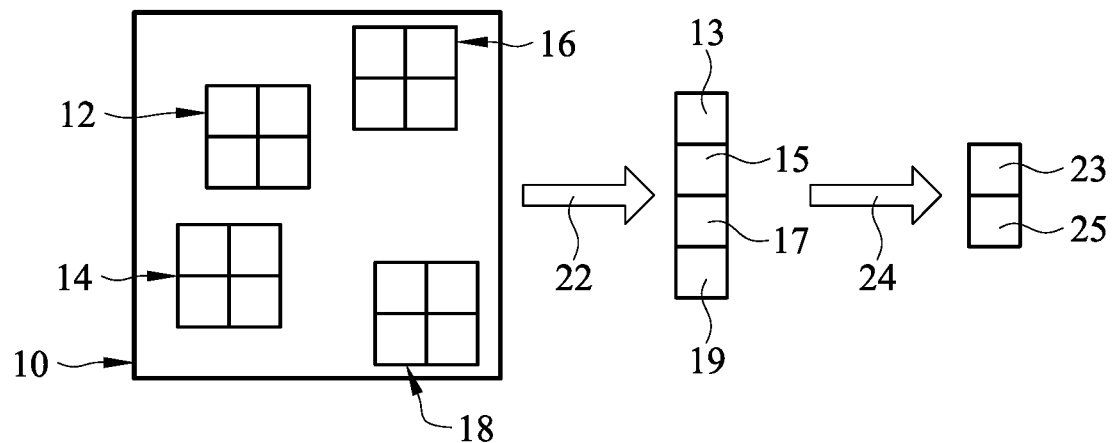
FIG. 1 is a schematic flow chart of an image operation method for obtaining an eye's gazing direction information in accordance with an embodiment of the present invention.

Embodiments of the invention are now described and illustrated in the accompanying drawings, instances of which are to be interpreted to be to scale in some implementations while in other implementations, for each instance, not. In certain aspects, use of like or the same reference designators in the drawings and description refers to the same, similar or analogous components and/or elements, while according to other implementations the same use should not. While the invention will be described in conjunction with these specific embodiments, it will be understood that it is not intended to limit the invention to these embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well-known process operations and components are not described in detail in order not to unnecessarily obscure the present invention. While drawings are illustrated in detail, it is appreciated that the quantity of the disclosed components may be greater or less than that disclosed, except where expressly restricting the amount of the components.

In this context, the term "feature extraction stages" refers to plural computing stages for extracting image features and comprises at least two extraction stages: a launch feature extraction stage and a terminal feature extraction stage. For convenience of explanation, the following embodiments employ and describe two feature extraction stages, but the number of feature extraction stages is not limited to two. When an embodiment is described in two feature extraction stages, the extraction stage of launch features is referred to as "the first feature extraction stage," and the terminal feature extraction stage is referred to as "the second feature extraction stage."

In addition, any feature extraction stage can compute a plurality of features sequentially or simultaneously. The launch feature extraction stage processes the data of an eye frame that is divided into a plurality of sub-frames, and the launch feature extraction stage extracts one or more features from the plurality of sub-frames in sequence.

For convenience of description, the following embodiment takes two sub-frames (a first sub-frame and a second sub-frame) as an example, and the features acquired from the data of the first sub-frame and second sub-frame in sequence are referred to as "the former feature" and "the latter feature." If four sub-frames are taken as an example, the former feature and the latter feature may be used to represent the features obtained from the first sub-frame and the fourth sub-frame, respectively. Alternatively, in another embodiment, the former feature and the latter feature may be used to represent the features obtained from the first sub-frame and the second sub-frame, or the features obtained from the second sub-frame and the third sub-frame, or the features obtained from the third sub-frame and the fourth sub-frame, respectively. The same principle can be applied to other embodiments with different number of sub-frames.

In addition, for the terminal feature extraction stage or the stages other than the launch feature extraction stage, the feature extraction stage going behind in time can apply a superposition operation to a portion or all features extracted by the previous feature extraction stage, so as to extract one or more features from the previous feature extraction stage. The terminal feature extraction stage extracts one or more features from the previous stages, and the extracted features are so-called "terminal features." It will be appreciated that, in the case described with two feature extraction stages, the launch features are the first features extracted from the first feature extraction stage, and the terminal features are the second features extracted from the second feature extraction stage. Moreover, the features obtained from the sub-frames may comprise, but are not limited to, for example, a contrast exceeding a predetermined ratio or value, a pattern having a degree of similarity exceeding a certain level compared with a predetermined pattern (e.g., an eye shape), and a detected region with a specific geometric shape.

Figure 2:
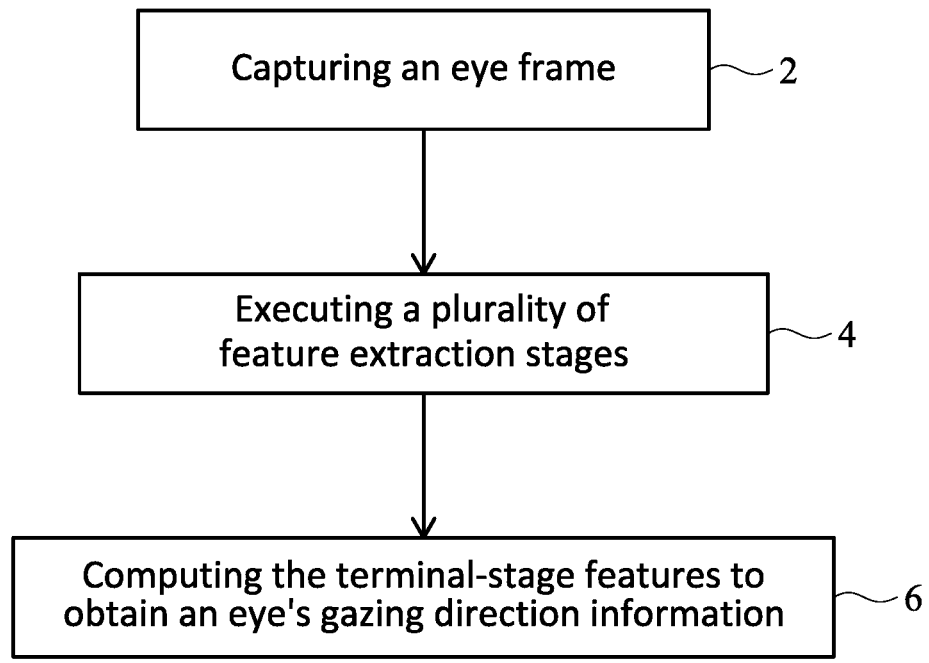
FIG. 2 is a flow chart of an image operation method for obtaining an eye's gazing direction information in accordance with an embodiment of the present invention.

FIG. 1 is a schematic flow chart of an image operation method for obtaining an eye's gazing direction information in accordance with an embodiment of the present invention, and FIG. 2 is a flow chart of an image operation method for obtaining an eye's gazing direction in accordance with an embodiment of the present invention.

Referring to FIGS. 1 and 2, the image operation method for obtaining an eye's gazing direction information of the present invention starts with an eye frame 10 captured by an appropriate method or device, and the captured eye frame 10 is divided into several sub-frames (step 2). The number of sub-frames is not limited. In the first embodiment, the eye frame 10 is divided into a first sub-frame 12, a second sub-frame 14, a third sub-frame 16, and a fourth sub-frame 18. The data amount of each sub-frame is less than or equal to the data amount of the eye frame 10.

Thereafter, in step 4, a plurality of feature extraction stages of the present invention are executed. In the present invention, the number of feature extraction stages is not limited. In the first embodiment two stages, including a first feature extraction stage 22 and a second feature extraction stage 24, are employed. In the first feature extraction stage 22, the features of each sub-frame are extracted by a matrix multiplication. In the first embodiment, a matrix operation with a uniform coefficient of ¼ is applied to the first sub-frame 12, the second sub-frame 14, the third sub-frame 16, and the fourth sub-frame 18, respectively, so as to obtain feature 13 of the first sub-frame 12, feature 15 of the second sub-frame 14, feature 17 of the third sub-frame 16, and feature 19 of the fourth sub-frame 18. It will be appreciated that the feature 13, the feature 15, the feature 17, and the feature 19 are all the first features (launch features) obtained by the first feature extraction stage 22.

Referring to FIGS. 1 and 2, the present invention is at least characterized in that, in the first feature extraction stage 22, when a data of the captured eye frame is sequentially transferred and a part of the data (e.g., a data of a former sub-frame) has been stored, features can be extracted from the former sub-frame by operation before the data of the latter sub-frame is needed to be stored. Therefore, when the former feature has been extracted, the data of the former sub-frame can be deleted from a storage site, and the storage site can be used to store the data of the latter sub-frame. Accordingly, it is not necessary to provide a storage unit/module with an excessive capacity, and hence the area of the entire eye-tracking device can be significantly reduced.

With continued reference to FIGS. 1 and 2, in the second feature extraction stage 24, one or more second features (23, 25) can be extracted from a part or all of the features 13, feature 15, feature 17, and feature 19 by appropriate coefficient matrix operations. In the first embodiment, the second feature 23 is obtained by using a machine learning coefficient matrix operation applied to feature 13, feature 15, feature 17, and the second feature 25 is obtained by using the machine learning coefficient matrix operation applied to feature 15, feature 17 and feature 19. It will be appreciated that in the first embodiment, both the second feature 23 and the second feature 25 are terminal features.

Continuing with reference to FIGS. 1 and 2, the second feature 23 and the second feature 25 are then computed to obtain an eye's gazing direction information (step 6). In the first embodiment, the eye's gazing direction information can be obtained by applying a superposition operation to the second feature 23 and the second feature 25 (terminal features). In the present invention, once a complete eye frame is obtained, all sub-frames have been acquired and the first features are extracted therefrom, and then the first features are used to calculate the second features, which is then used to calculate the eye's gazing direction. In the embodiment with two stages, because the data of the former sub-frame has been computed and the time delay only occurs during the operation of the second features, the total computation time can be therefore reduced.

Figure 3:
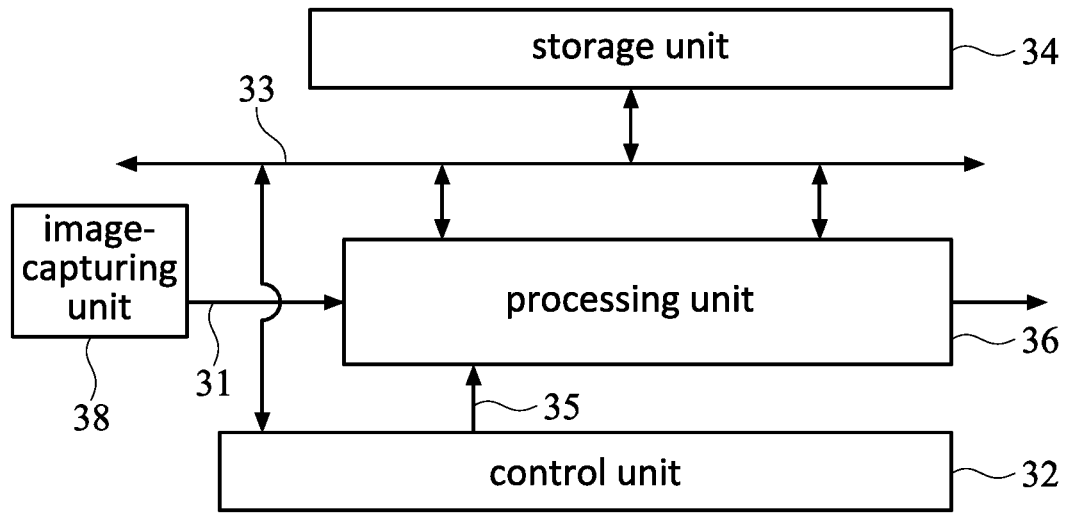
FIG. 3 is a block diagram of an image operation system for obtaining an eye's gazing direction information in accordance with an embodiment of the present invention.

FIG. 3 is a block diagram of an image operation system for obtaining an eye's gazing direction information according to an embodiment of the present invention. Referring to FIG. 3, the image operation system of the present invention comprises a control unit 32, a storage unit 34, and a processing unit 36. The processing unit 36 receives an image frame data 31 from an image-capturing unit 38, and sequentially executes a plurality of feature extraction stages through control of the control unit 32, so as to output the terminal features used for obtaining an eye's gazing position. In this embodiment, a bus 33 or suitable wires can be used to communicate the control unit 32 and the storage unit 34, and communicate the storage unit 34 and the processing unit 36. The control unit 32 can output a control command 35 to the processing unit 36. In addition, the processing unit 36 can be a single processor that performs all operations of the feature extraction stages. Moreover, the processing unit 36 can finely perform the operations of the feature extraction stages through control command(s) 35 of the control unit 32, and the centralized operation by the processing unit 36 can reduce the hardware area and optimize the hardware efficiency.

Referring to FIGS. 1 and 3, when the image frame data 31 of the eye frame 10 is received, the data of the first sub-frame 12 is first stored in the storage unit 34, and then the processing unit 36 extracts features 13 from the data of the first sub-frame 12. After the feature 13 is extracted, the data of the first sub-frame 12 stored in the storage unit 34 is no longer needed and can be deleted. On the other hand, the data of the second sub-frame 14 of the eye frame 10 can be stored in the storage unit 34 that has been emptied. After that, the processing unit 36 extracts features 15 from the data of the second sub-frame 14 and then the data of the second sub-frame 14 is deleted from the storage unit 34, and so forth. Therefore, the storage unit 34, such as a memory module, can have a reduced hardware area without requiring a large capacity.

Figure 4:
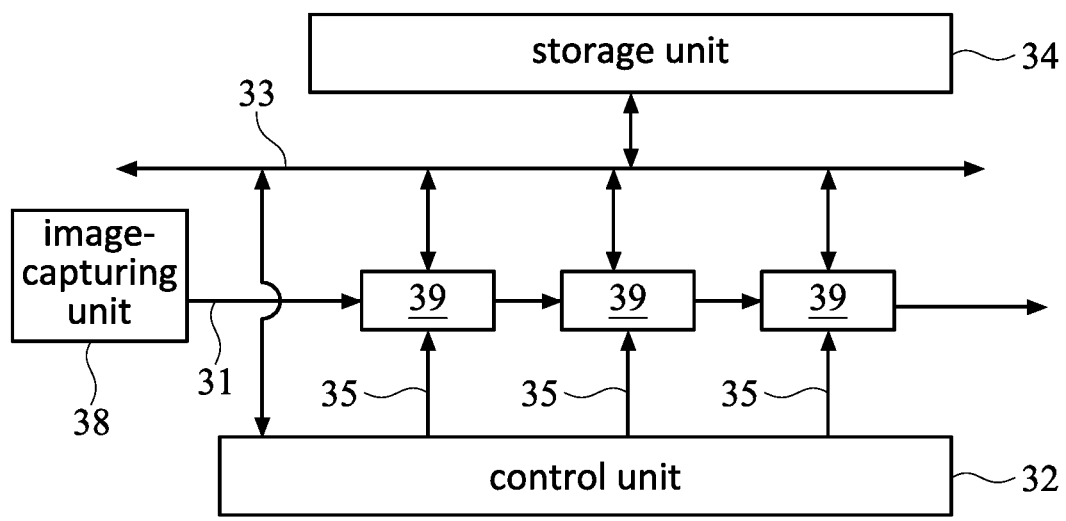
FIG. 4 is a block diagram of an image operation system for obtaining an eye's gazing direction information in accordance with another embodiment of the present invention.

FIG. 4 is a block diagram of an image operation system for obtaining an eye's gazing direction information according to another embodiment of the present invention. Different from FIG. 3, the processing unit 36 of the image operation system of the present invention comprises a plurality of stage processing sub-units 39 rather than an integrated single processor, and each stage processing sub-unit 39 sequentially operates the features from the previous stage processing sub-unit 39 according to a control command 35. And the features of current stage processing sub-unit 39 are extracted and then transmitted to the next stage processing sub-unit 39. Thus, the object of the present invention can also be achieved by the multi-stage operation.

Although specific embodiments have been illustrated and described, it will be appreciated by those skilled in the art that various modifications may be made without departing from the scope of the present invention, which is intended to be limited solely by the appended claims.

What is claimed is:

1. An image operation method for eye-tracking, comprising the steps of:
   capturing an eye frame and dividing the eye-frame into a plurality of sub-frames;
   executing a plurality of feature extraction stages to obtain an eye's gazing direction information, wherein the plurality of feature extraction stages comprises at least a launch feature extraction stage and a terminal feature extraction stage, the launch feature extraction stage extracts launch features from the plurality of the sub-frames, and the terminal feature extraction stage extracts terminal features from the launch features; and
   computing the terminal features to obtain the eye's gazing direction information.

2. The image operation method as recited in claim 1, wherein the sub-frames comprise at least a first sub-frame and a second sub-frame, and the launch features are extracted by the steps of:
   (1) storing a data of the first sub-frame in the storage unit;
   (2) obtaining an former feature from the data of the first sub-frame;
   (3) deleting the data of the first sub-frame stored in the storage unit;
   (4) storing a data of the second sub-frame in the storage unit; and
   (5) obtaining a latter feature from the data of the second sub-frame data;
   wherein the former feature and the latter feature are two of the launch features.

3. The image operation method as recited in claim 2, wherein two or more of the steps (1)-(5) are performed at the same time.

4. The image operation method as recited in claim 3, wherein the step (1) and the step (4) are performed at the same time, and the step (2) and the step (5) are performed at the same time.

5. The image operation method as recited in claim 3, wherein the step (2), the step (3), and the step (4) are performed at the same time.

6. The image operation method as recited in claim 2, wherein a matrix multiplication is applied to the launch feature extraction stage to obtain the former feature and the latter feature.

7. The image operation method as recited in claim 6, wherein the terminal feature extraction stage obtains one or all of the terminal features by applying a superposition operation to the former feature and the latter feature.

8. The image operation method as recited in claim 1, wherein a matrix multiplication is applied to the launch feature extraction stage to obtain the launch features.

9. The image operation method as recited in claim 1, wherein the terminal feature extraction stage obtains the terminal features by applying a superposition operation to part or all of the launch features.

10. The image operation method as recited in claim 1, wherein any one of the plurality of sub-frames has a data amount less than or equal to a data amount of the eye frame.

11. The image operation method as recited in claim 1, wherein the number of the feature extraction stages is at least two.

12. An image operation system for eye-tracking, comprising:
   a control unit for providing a control command;

a processing unit performing a plurality of feature extraction stages on a plurality of sub-frames of an eye frame to obtain an eye's gazing direction information according to the control command, wherein the plurality of feature extraction stages comprises at least a launch feature extraction stage and a terminal feature extraction stage, the launch feature extraction stage extracts launch features from the plurality of the sub-frames, and the terminal feature extraction stage extracts terminal features from the launch features; and a storage unit for storing the launch features and the terminal features;

wherein the storage unit comprises a memory module, and the processing unit comprises a single processor or a plurality of stage processing sub-units.

13. The image operation system as recited in claim 12, wherein the storage unit temporarily stores a data of each of the plurality of sub-frames during the operation of the launch feature extraction stage.

14. The image operation system as recited in claim 12, further comprising an image-capturing unit for providing the eye frame.

* * * * *